July 30, 1963 F. G. WEIS 3,099,288
NONCLOGGING CHECK VALVE
Filed April 11, 1960 3 Sheets-Sheet 1

INVENTOR.
Frank G. Weis
BY
Hovey, Schmidt, Johnson & Hovey
ATTORNEYS.

July 30, 1963 F. G. WEIS 3,099,288
NONCLOGGING CHECK VALVE
Filed April 11, 1960 3 Sheets-Sheet 2
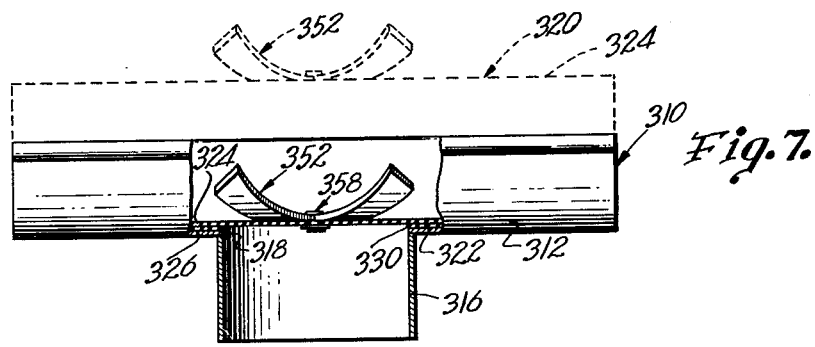
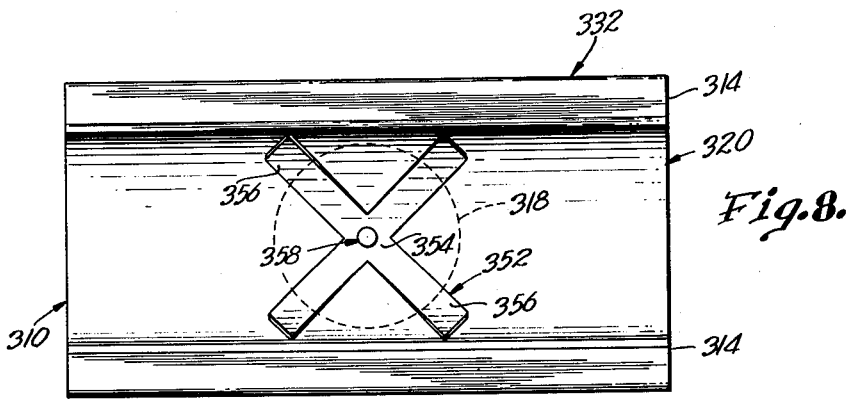
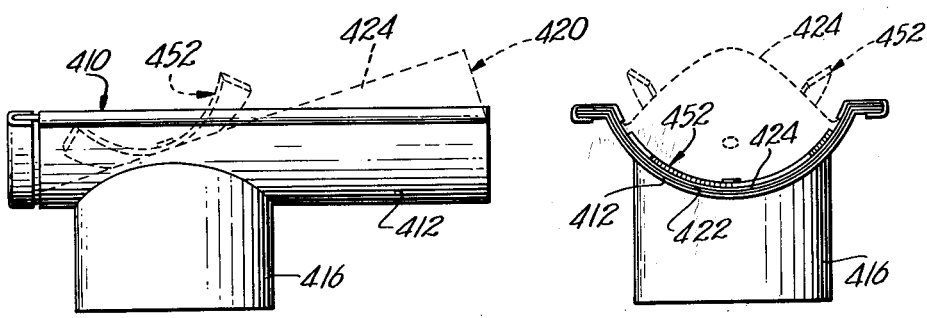
INVENTOR.
Frank G. Weis
BY
*Hovey, Schmidt, Johnson & Hovey*
ATTORNEYS.

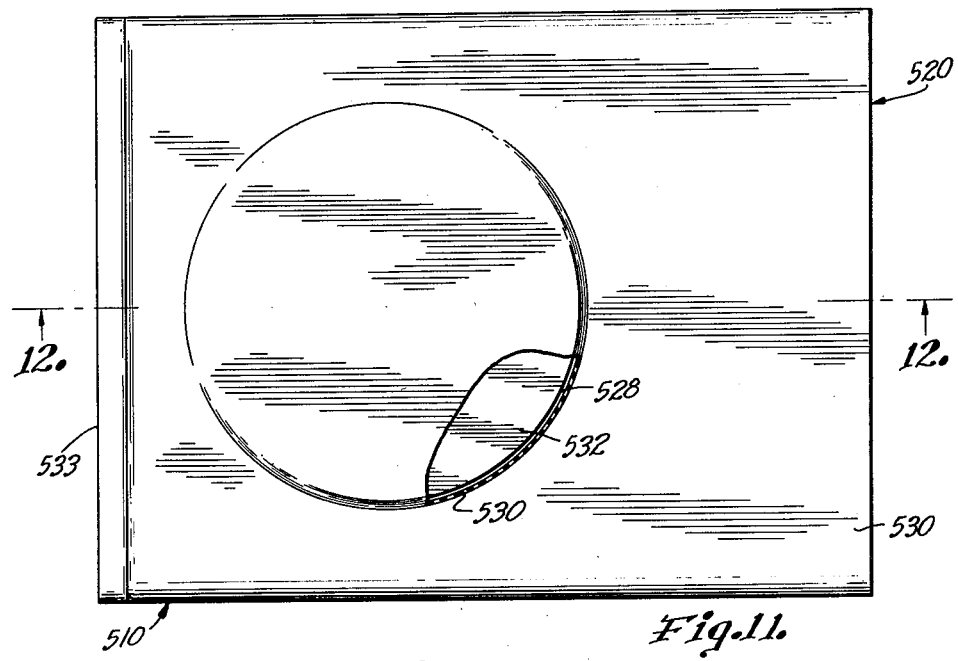
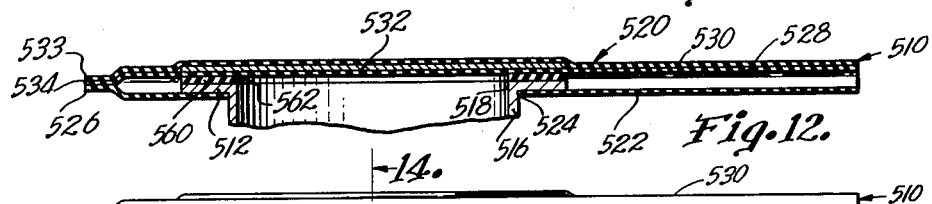
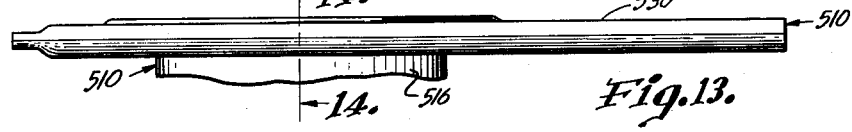
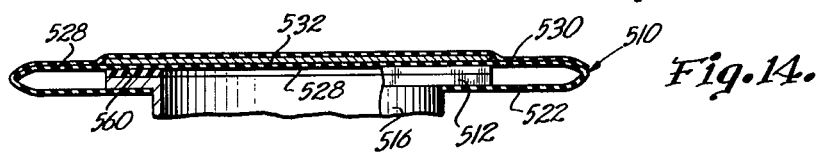
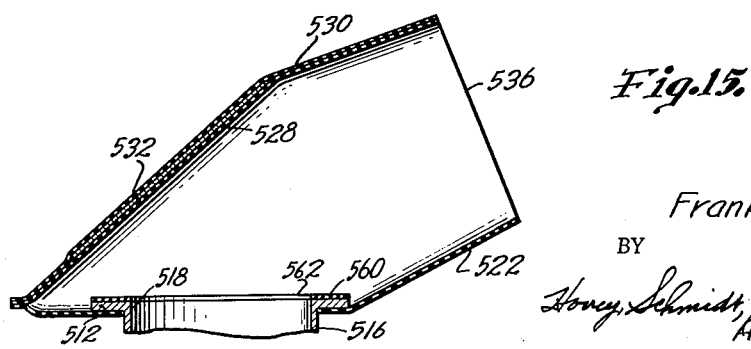

United States Patent Office 3,099,288
Patented July 30, 1963

1

3,099,288
NONCLOGGING CHECK VALVE
Frank G. Weis, Kansas City, Mo., assignor to Union Tank Car Company, Chicago, Ill., a corporation of New Jersey
Filed Apr. 11, 1960, Ser. No. 21,465
13 Claims. (Cl. 137—525.3)

This invention relates to fluid control apparatus and particularly to improved nonclogging check valve structure for utilization in fluid transfer equipment.

The present check valve structure has utility in various types of fluid conveying apparatus and particularly equipment for transferring fluids having solid particles therein. Since sewage normally contains solid materials suspended in the liquid phase, the check valve is especially useful when disposed in a conduit for conveying sewage or similar materials from a tank or basin to another treatment unit or disposal area. It is desirable that the sewage including all solid particles pass freely through the valve, yet it is necessary that the valve structure close properly to preclude passage of any liquid through the conduit when flow of fluid ceases or a vacuum is placed on the tank or basin from which the sewage is directed and to which the conduit having the present check valve structure therein is connected.

The primary object of the present invention is to provide check valve structure for fluid transfer equipment which will not become clogged during flow of fluid therethrough, and yet will close without leakage of air or liquid therethrough upon cessation of flow of fluid or upon imposition of a vacuum on the apparatus, tank or other equipment for receiving the fluid and to which the conduit containing the check valve is coupled.

A further important object of the invention is to provide check valve structure of the characteristics described above which is extremely simple in construction, may be manufactured at a minimum cost and which may be repaired when necessary by the simple expedient of replacing the flexible diaphragm or valve components constituting a part of the valve.

A still further aim of the invention is to provide a check valve which will close to preclude further passage of fluid therethrough, notwithstanding the fact that solid particles or materials may be deposited on the exposed surfaces of the flexible elements positioned to close an aperture in the valve.

Other significant objects of the invention include the provision of a nonclogging check valve for use in fluid transfer equipment wherein the valve constitutes a tubular, flexible member having an opening therein permitting the fluid to flow into the tubular member and thence through the same during the time that the valve is open, and with the resilient member being mounted on a suitable support therefor in a manner to cause the same to collapse and thereby preclude passage of fluid through the same when suction is applied to the structure to which the line having the check valve therein is attached, or when flow of liquid materials ceases, whereby the defined valve closes quickly and completely even though solid particles may be left in the interior of the tubular member prior to collapsing thereof; to the provision of check valve structure as described above which is adapted to be mounted on the upright segment of a fluid conduit for discharge of fluid upwardly through an opening in the valve body, and wherein is included weight means on the flexible, movable portion of the valve element to gravitationally bias the flexible portion of the valve element into the normal closing position thereof; to another type of check valve structure comprising a pair of rectangular, flexible valve elements interconnected along three edges

2 thereof and placed over the valve body in a manner to permit the free margins of the flexible elements to part under pressure of fluid flowing through the supply conduit; to valve structure as set forth hereinabove including a pair of flexible valve elements of rectangular configuration and interconnected along three marginal edges thereof, wherein closing of the valve is effected immediately upon cessation of flow of the fluid by virtue of collapsing of the valve elements into relatively flat condition in closing relationship to the opening in the valve; to the provision of check valve structure having a flexible member normally disposed in closing relationship to an opening in the valve body and having inflexible means on the movable member, shiftable therewith and of a size to prevent cupping of the flexible member into the valve body opening when a negative pressure is applied to the fluid conduit having the check valve disposed therein; and to other important objects and details of construction of the present check valve structure which will become obvious or be explained in greater detail as the following specification progresses.

In the drawings:

FIG. 7 is a side elevational view of a fourth type of check valve embodying the concepts of the instant invention, with certain parts thereof being broken away and in section to reveal details of construction thereof, and with the open position of the flexible element being illustrated in dotted lines;

FIG. 8 is a plan view of the check valve structure illustrated in FIG. 7;

FIG. 9 is a side elevational view of a fifth type of check valve structure as contemplated by this invention, with the open position of the flexible element being indicated by dotted lines;

FIG. 10 is an end elevation view of the check valve structure as shown in FIG. 9, with the open position of the flexible element also being illustrated in dotted lines;

FIG. 11 is a plan view of a sixth type of check valve structure having the features of the present invention incorporated therein, with a portion of the flexible element of the valve being broken away and in section to show the construction of the valve;

FIG. 12 is a vertical cross-sectional view taken on the line 12—12 of FIG. 11;

FIG. 13 is a fragmentary, side elevational view of the valve as illustrated in FIGS. 11 and 12;

FIG. 14 is a vertical cross-sectional view taken on the line 14—14 of FIG. 13; and FIG. 15 is a fragmentary, vertical cross-sectional view of the valve shown in FIGS. 11 to 14, and illustrating the disposition of the flexible element of the valve when the same is in an open condition.

The check valve structure disclosed herein, although having greatest utility in the sewage treatment field, may also be used to advantage in other fluid transfer equipment wherein the fluid may have solid particles therein. For example, the check valve may be employed in apparatus for pumping fish from one storage area to another or to processing equipment, in apparatus for transferring sugar beets while in water, and other similar uses.

Figure 1:
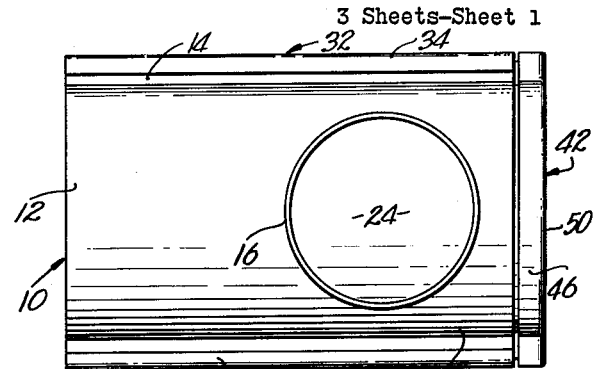
FIGURE 1 is a plan view of one type of nonclogging check valve embodying certain concepts of the present invention.
Figure 3:
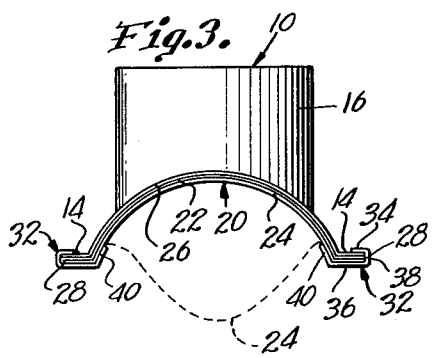
FIG. 3 is an end elevational view of the valve shown in FIGS. 1 and 2.
Figure 2:
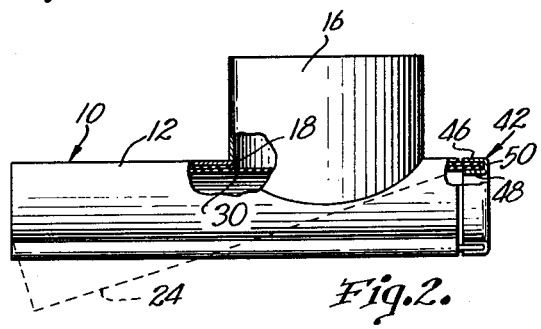
FIG. 2 is a side elevational view of the check valve shown in FIG. 1, certain parts thereof being broken away and in section to reveal details of construction of the same.

The nonclogging check valve illustrated in FIGS. 1 to 3 inclusive and broadly numerated 10, includes a semicylindrical main body member 12, provided with outwardly projecting, coplanar flange portions 14 extending longitudinally of member 12 in parallelism and constituting integral projections of the outer side margins of member 12.

Means for coupling member 12 to a supply of liquid sewage comprises a coupling 16 welded to the outer convex surface of member 12, it being noted that the latter is provided with an opening 18 therein complemental with the inner margin of coupling 16 welded to member 12.

Valve structure broadly designated 20 and mounted on member 12 includes a tubular component rebent upon itself to present a lining section 22 and an outer movable section element 24. The flexible component is of sufficient width that when folded into a flat condition, lining section 22 thereof may lie in complemental engagement with the inner concave surface 26 of member 12, while the outer margins 28 underlie and are disposed in engagement with respective flange portions 14 of the member 12. An adhesive is utilized to permanently secure the outer face of lining section 22 to the inner concave surface 26 of member 12, with lining section 22 being provided with an aperture 30 therein of equal dimensions to and aligned with opening 18 in member 12.

Means for securing the flexible valve component to member 12 includes a pair of identical clamp strips 32 extending the length of corresponding flange portions 14. As indicated in FIGS. 2 and 3, each of the clamp strips 32 has a pair of substantially parallel legs 34 and 36 interconnected by a bight 38 of dimensions such that flange portions 14 and the margins 28 of the flexible component secured to member 12, are clamped between legs 34 and 36. Outer, integral section 40 of each strip 32 and constituting an extension of respective legs 36, is positioned in substantially complemental proximal relationship to opposed curved portions of surface 26 of member 12 to thereby not only retain the flexible component forming a part of structure 20 on member 12, but also precluding displacement of clamp strips 32 from member 12.

Means for closing one end of the tubular component comprising valve structure 20 includes connector means 42 which is of generally semicircular configuration, has a generally transversely U-shaped, cross-sectional shape and thereby includes a pair of parallel legs 46 and 48 interconnected by bight 50. Viewing FIG. 3, it is to be noted that connector means 42 substantially conforms to the configuration of one end of member 12 and receives respective ends of the lining section 22 and section element 24 of valve structure 20 therewithin to preclude passage of liquid or air through abutting end margins of section 22 and element 24 clamped therebetween.

Assuming that check valve 10 is positioned within a receptacle and coupling 16 is connected to a sewage supply line leading from another tank or basin, gravitation of liquid through coupling 16 and onto the inner surface of section element 24 causes the same to shift downwardly to the dotted line positions illustrated in FIGS. 2 and 3, whereby the sewage may flow evenly through the check valve.

However, when a vacuum is applied to the tank to which check valve 10 is connected, element 24 of structure 20 immediately moves into a position complementally engaging the inner surface of lining section 22 and thereby effectively closing opening 18 as well as aperture 30 to preclude passage of liquid or air through the outer open end of structure 20. Such closing takes place even though particles or other foreign material may be deposited on the inner surface of element 24, the necessary seal being provided by virtue of the relatively large area of lining section 22 as well as section element 24 of tubular valve structure 20.

It is to be noted that when section element 24 is in the dotted line location as shown in FIGS. 2 and 3, the same is inclined downwardly to facilitate passage of solids and other foreign particles through check valve 10 and since it is preferred to construct structure 20 of highly flexible material such as rubber, it can be seen that when the same is wet and thereby relatively slick, the solids readily flow over the surfaces of the valve.

Figure 4:
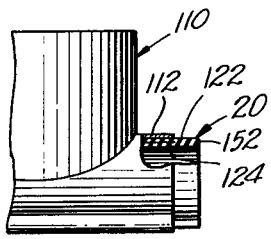
FIG. 4 is a fragmentary, side elevational view of a second type of check valve utilizing a different flexible element therein, with certain parts of the valve being broken away and in section to show the construction of the same.

Check valve 110, illustrated in FIG. 4, is identical with check valve 10 with the exception that valve structure 20 comprises a flat, elongated sheet of rubber rebent upon itself along the margin 152 to preclude the necessity of utilizing connection means such as 42 of check valve 10. In any event, the lining section 122 thereof is also adhesively secured to the inner surface of member 112, while the section element 124 thereof is free to move up and down to effect opening and closing of the valve in the same manner as described with respect to check valve 10. In lieu of utilization of a flat sheet folded upon itself, a pair of individual flexible elements may be employed, with the margins 152 thereof cemented together or otherwise adhesively interconnected to provide the required seal therebetween.

Figure 5:
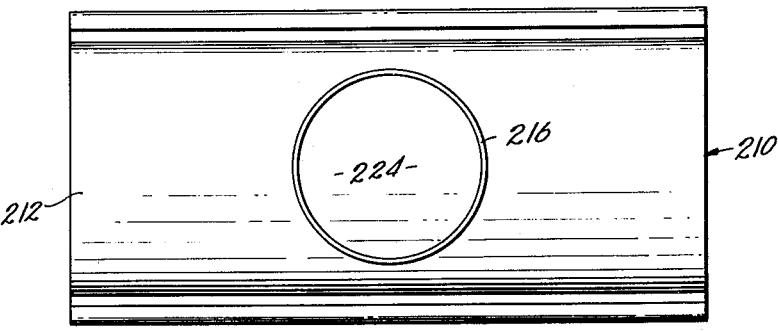
FIG. 5 is a plan view of a third modified form of the instant invention.
Figure 6:
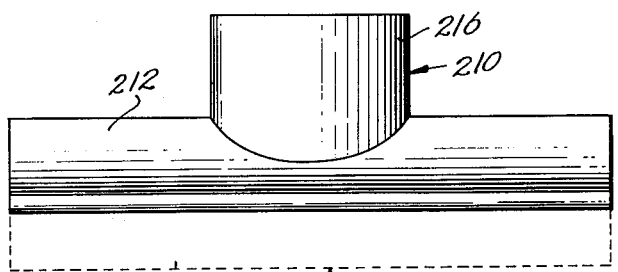
FIG. 6 is a side elevational view of the valve shown in FIG. 5 and with the open position of the flexible element being illustrated in dotted lines.

Check valve 210 illustrated in FIGS. 5 and 6 is identical with check valve 10 with the exception that coupling 216 is welded to the convex surface of member 212 substantially intermediate the ends thereof, and the flexible valve structure 220 comprises a tubular component coextensive in length with member 212 but not having one end thereof closed as is the case with structure 20, which is closed at one end by connector means 42. Thus, in utilization of valve 210, the lower section element 224 moves down to the dotted line position shown in FIG. 6, whereas upon application of suction to the supply tank, section element 224 moves up into complemental engagement with the inner surface of the lining section forming a part of structure 220 and thereby closing the aperture through lining section 222 and member 212.

The check valve structure broadly numerated 310 and shown in FIGS. 7 and 8, is similar to the valve 210 with the main difference being the manner in which structure 310 is mounted during operation thereof. Elongated, semicylindrical member 312, having longitudinally extending, outwardly projecting flange portions 314 on opposed longitudinal margins thereof, is provided with a centrally disposed opening 318 therein complementally registering with a tubular coupling 316 welded to the outer convex surface of member 312 intermediate the ends thereof, as shown in FIG. 7. Coupling 316 is particularly adapted to be connected to an upright section of a sewage supply conduit so that the sewage is discharged upwardly through opening 318 for flow in opposite directions along the horizontal concave inner surface 326 of member 312.

Flexible valve structure broadly designated 320 and mounted on member 312 includes a tubular component rebent upon itself to present a lining section 322 and an outer movable section element 324. The flexible, tubular component is of sufficient width that when folded into a flat condition, lining section 322 thereof may lie in complemental engagement with the inner concave surface 326 of member 312, while the outer margins thereof overlie respective flange portions 314 of the member 312. It is also contemplated in this form of the invention that an adhesive be utilized to permanently secure the outer face of lining section 322 to the inner concave surface 326 of member 312, with lining section 322 also having an aperture 330 therein of equal dimensions to and aligned with opening 318 in member 312.

The outer margins of flexible valve structure 320 are secured to corresponding flange portions 314 of member 312 by clamp strips 332 which are identical in construction, mounting and operation with clamp strips 32 described above and illustrated in FIGS. 1 to 6 inclusive.

A spanning assembly in the nature of a weight broadly numerated 352 is mounted on section element 324 of flexible valve structure 320 and preferably includes a central hub portion 354 and a number of longitudinally arcuate arm portions 356 integral with hub portion 354 and extending radially therefrom as best shown in FIG. 8. Rivet means 358 extends through hub portion 354 of weight 352 as well as section element 324 of structure 320. The arm portions 356 of weight 352 extend outwardly a sufficient distance to cause weight 352 to be of greater transverse dimensions than the width of opening 318, and since weight 352 is coaxial with coupling 316, the arm portions 356 engage the peripheral edge of member 312 defining opening 318 to thereby cause section element 324 to close opening 318 when element 324 is at its closed position, as shown in FIG. 7.

In utilization of check valve structure 310, flow of sewage upwardly in the conduit connected to coupling 316 opens the valve by virtue of upward movement of section element 324 to a dotted line position as illustrated in FIG. 7, whereupon the sewage is free to travel along the concave surface presented by member 312 for overflow at opposite ends thereof. Upon cessation of flow of the sewage, weight 352 gravitationally biases section element 324 into closing relationship to opening 318, whereupon the sewage conduit is effectively sealed against entrance of liquid and air thereinto. This sealing action takes place even if solid particles of sewage are disposed on the inner surface of lining section 322 by virtue of the large surface area presented by section element 324 in engagement with lining section 322.

Check valve structure 410, shown in FIGS. 9 and 10, is substantially identical to the check valve 10 shown in FIGS. 1 to 3, inclusive, with the exception of a weight 452 mounted on section element 424 of flexible valve structure 420 for biasing section element 424 into closing relationship to the opening in semicylindrical member 412 and which registers with cylindrical coupling 416 welded to the outer convex surface thereof. It can be appreciated that check valve structure 410 is also adapted to be connected to the upright section of a sewage supply conduit for discharge of sewage from structure 410. After cessation of flow of such sewage, weight 452 biases section element 424 into engagement with lining section 422 of structure 420 in a manner as outlined above.

Although incorporating the general principles of the construction of check valves 10, 110, 210, 310 and 410, check valve structure 510 differs in certain major respects, and relating primarily to the construction of the flexible valve unit as well as the fitting upon which the valve unit is mounted. Structure 510 includes a cylindrical coupling 516 adapted to be connected to an upright section of a sewage supply conduit in the same manner as valve structures 310 and 410, for discharge of sewage through flexible valve structure 520 mounted on member 512 secured to the upper end of coupling 516. Member 512 is of polygonal configuration and preferably square, as shown in FIGS. 12 and 14, and is provided with a centrally disposed opening 518 therein equal to the diameter of coupling 516 and coaxial with the latter. A square rubber gasket 560 is adhesively secured to the upper surface of member 512, has a peripheral margin complemental with the edge of member 512, and is provided with a central orifice 562 therein registering with opening 518.

Flexible valve structure 520 includes a generally rectangular component 522 of greater width than member 512 and of substantially greater length than the latter. Component 522 has an opening 524 therein in closer proximity to margin 526 of component 522 than opposed margin 528 thereof, with opening 524 being of a size to clear coupling 516 and with the peripheral margin of component 522 defining opening 524 being in engagement with the outer surface of coupling 516 when structure 520 is mounted on member 512 and coupling 516.

Although component 522 may be a separate piece of sheet rubber or the like, it is to be preferred that the same constitute one portion of a relatively large sheet, with component 522 constituting the central area thereof while opposed outer portions 528 and 530 are folded over one another, as shown in FIG. 14. During overlapping of portions 528 and 530, a spanner assembly such as metal disc 532 is placed between portions 528 and 530 in a position to be disposed in direct opposition to opening 518 upon closing of the valve, as will be hereinafter described. Those areas of portions 528 and 530 in abutting relationship are interconnected through adhesive means or by vulcanization procedure, as is well known in the art.

It is also contemplated that the margins 533 and 534 of portions 528 and 530 be interconnected by an adhesive or through vulcanization, as shown in FIG. 12. Thus, it can be seen that the valve structure presented by central component portion 522 and outer portions 528 and 530 are interconnected along three sides of the rectangular unit, with the other side of the valve structure 520 remaining open to permit sewage to flow outwardly therethrough.

During operation of check valve structure 510, flow of sewage through the supply conduit and against the surface of the flexible valve element defined by portion 528 of the rubber sheet, causes portions 528 and 530 to move upwardly as shown in FIG. 15 to a position clearing the liquid sewage for discharge through the outlet 536 of structure 520. If square member 512 is approximately four inches across, then portions 528 and 530 should be approximately six inches thereacross to permit structure 520 to expand into generally tubular configuration, as illustrated in FIG. 15, of sufficient size to clear particles of a diameter equal to that of the coupling 516.

Upon cessation of flow of the sewage, metal disc 532 gravitationally biases portions 528 and 530 downwardly until the inner surface of portion 528 closes opening 562, as shown in FIG. 12. The size of metal disc 532 is important because this precludes the upper valve element presented by portions 528 and 530 from dishing down into component 516 under a negative pressure in the sewage supply conduit. It should also be pointed out that the relatively long flat ends of component 522 and the valve element presented by portions 528 and 530 assure sealing of the valve, notwithstanding disposition of solid particles on the internal surfaces of structure 520 upon closing thereof.

Structure 520 may readily be mounted on member 512 by grasping component 522 and expanding opening 524 therein sufficiently to clear member 512. The margins of component 522 defining opening 524 are then pushed upwardly into firm engagement with the undersurface of member 512. The construction described facilitates replacement of structure 520 or removal for cleaning purposes.

It is also to be pointed out that check valve structure 510 is adapted for utilization in an inverted position opposite to that shown, if desired, with negative pressure in the conduit effecting closing of the valve. Metal disc 532 operates to prevent the flexible valve element presented by portions 528 and 530 from collapsing into opening 562 and thereby dishing into the same a substantial distance.

Having thus described the invention what is claimed as new and desired to be secured by Letters Patent is:

1. In check valve structure for fluids which may contain solid particles, an elongated, transversely arcuate member provided with an opening therein and having opposed, longitudinally extending side margins; a coupling secured to said member on the convex surface thereof, communicating with said opening in the member and adapted to be coupled to a fluid supply conduit; a resilient lining covering at least a part of the inner concave surface of the member opposed to said coupling and having an aperture therein of equal dimensions to and registering with said opening in the member; an elongated, flexible valve element having opposed, longitudinally extending side edges; and means securing said edges of the element to said member substantially along respective side margins of the same with said element being disposed in overlying relationship to said concave surface of the member, said element being of sufficient width and length to complementally engage the concave surface of said resilient lining in full closing relationship to said aperture therein and thereby the opening in said coupling.

2. Structure as set forth in claim 1 wherein said lining and the valve element are of substantially equal length.

3. Structure as set forth in claim 1 wherein is provided connector means at one end of the element and said lining respectively for interconnecting proximal, transversely extending extremities thereof and providing an air and liquid-tight seal therebetween.

4. Structure as set forth in claim 3 wherein said connector means comprises a substantailly semicircular, transversely U-shaped component receiving said extremities of the element and said lining therewithin in clamping engagement thereto.

5. Structure as set forth in claim 1 wherein is provided means securing said lining to the inner concave surface of the member throughout substantially the entire area of the lining.

6. Structure as set forth in claim 1 wherein said lining and said element are of one-piece construction with opposed sides thereof being creased and clamped between the outer margin of said member and the means securing the same to said member.

7. Structure as set forth in claim 1 wherein said element and the lining are of relatively pliable rubber sheet material.

8. Structure as set forth in claim 1 wherein the margins of said element and said lining at one end thereof are integrally interconnected.

9. Structure as set forth in claim 1 wherein is provided weight means on said element for biasing the latter toward the member when the latter is in a horizontal position and with said member disposed thereabove.

10. Structure as set forth in claim 1 wherein said side margins of the member have relatively flat, outwardly projecting flange portions, the side edges of said element being disposed in flat engagement with said flange portions and said means securing said side edges of the element to said flange portions of the member extending throughout the entire length of the element and providing an air and liquid-tight seal between the latter and said member.

11. Structure as set forth in claim 10 wherein said means securing the side edges of the element to said flange portions of the member comprises an elongated strip for each of the flange portions respectively and substantially coextensive in length with corresponding side edges of the element, each of said strips having a U-shaped outer segment receiving a respective side edge and at least a part of the proximal flange portion of the member therebetween in clamping engagement therewith, and an inner, angularly disposed section in substantially complemental, proximal relationship to the member at the zone of juncture of the main portion thereof with respective flange portions of the same to releasably maintain said strips on said flange portions of the member.

12. In a sewage conduit through which flow relatively large solid bodies in a liquid stream, said conduit frequently being subjected to negative pressure in a direction reverse to the flow of said stream, an improved check valve for passing said bodies in the direction of liquid flow yet preventing reverse liquid flow under negative pressure, comprising: a relatively rigid member provided with an opening therein, coupling means on said member communicating with said opening and connecting same to said sewage conduit; a resilient highly flexible valve element; means securing the element to said member on opposite sides of said opening in normal full closing relationship thereto, said element being capable of flexing transversely thereof under pressure of liquid in said condiut, into an expanded configuration permitting relatively large bodies in said liquid to pass through the opening and between the element and said member; and spanner means on said element in direct opposition to said opening for preventing the element from cupping into said opening when a negative pressure is applied to said conduit, and resilient liner means between said spanner means and said member.

13. Structure as set forth in claim 12 wherein said spanner means is of greater transverse width than the diameter of the opening.

References Cited in the file of this patent
UNITED STATES PATENTS

| | | |
|---|---|---|
| 141,587 | Painter | Aug. 5, 1873 |
| 187,411 | Painter | Feb. 13, 1877 |
| 298,208 | Irving | May 6, 1884 |
| 1,680,757 | Yablick | Aug. 14, 1928 |
| 1,956,691 | McCune | May 1, 1934 |
| 1,969,118 | Brucker | Aug. 7, 1934 |
| 1,992,495 | Lynde | Feb. 26, 1935 |
| 2,283,835 | Weaver | May 19, 1942 |